US009818000B2

(12) United States Patent
Dworak

(10) Patent No.: US 9,818,000 B2
(45) Date of Patent: Nov. 14, 2017

(54) PROTECTING HIDDEN CONTENT IN INTEGRATED CIRCUITS

(71) Applicant: Southern Methodist University, Dallas, TX (US)

(72) Inventor: Jennifer L. Dworak, Dallas, TX (US)

(73) Assignee: Southern Methodist University, Dallas, TX (US)

( * ) Notice: Subject to any disclaimer, the term of this patent is extended or adjusted under 35 U.S.C. 154(b) by 0 days.

(21) Appl. No.: 14/666,295

(22) Filed: Mar. 23, 2015

(65) Prior Publication Data
US 2015/0349969 A1 Dec. 3, 2015

Related U.S. Application Data

(60) Provisional application No. 61/969,220, filed on Mar. 23, 2014.

(51) Int. Cl.
| | |
|---|---|
| *G06F 21/00* | (2013.01) |
| *G06F 21/79* | (2013.01) |
| *G06F 21/72* | (2013.01) |
| *G06F 21/80* | (2013.01) |
| *G06F 21/75* | (2013.01) |
| *G01R 31/3185* | (2006.01) |
| *G06F 13/42* | (2006.01) |

(52) U.S. Cl.
CPC ..... *G06F 21/79* (2013.01); *G01R 31/318588* (2013.01); *G06F 21/72* (2013.01); *G06F 21/75* (2013.01); *G06F 21/80* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 7,653,849 | B1 * | 1/2010 | Tabatabaei | G01R 31/318508 714/726 |
| 8,495,758 | B2 | 7/2013 | Goyal et al. | |
| 8,881,301 | B2 | 11/2014 | Crouch et al. | |
| 2004/0236954 | A1 | 11/2004 | Vogt et al. | |
| 2009/0132882 | A1 * | 5/2009 | Chen | G01R 31/318536 714/731 |
| 2011/0083195 | A1 * | 4/2011 | Crouch | G01R 31/318558 726/27 |
| 2011/0271160 | A1 | 11/2011 | Whetsel | |

(Continued)

OTHER PUBLICATIONS

Nara et al., "State-dependent Changeable Scan Architecture against Scan-based Side Channel Attacks," Circuit Systems ISCAS Proc. 2010 IEEE Int. Symp. on, May 2010, pp. 1867-1870.*

(Continued)

*Primary Examiner* — Hadi Armouche
*Assistant Examiner* — Andrew Steinle
(74) *Attorney, Agent, or Firm* — Daniel J. Chalker; Chalker Flores, LLP

(57) ABSTRACT

An integrated circuit has a first scan cell segment, a second scan cell segment connected to one or more hidden content, and a scan cell circuit connected to the first scan cell segment and the second scan cell segment. The scan cell circuit alternatively provides access to the first scan cell segment and the second scan cell segment based on a state of the scan cell circuit.

39 Claims, 9 Drawing Sheets

(56) References Cited

U.S. PATENT DOCUMENTS

| | | | | |
|---|---|---|---|---|
| 2011/0314514 A1* | 12/2011 | Goyal | ............ | G01R 31/318572 726/2 |
| 2013/0067290 A1* | 3/2013 | Tekumalla | ..... | G01R 31/318575 714/726 |
| 2014/0095101 A1* | 4/2014 | Gizdarski | ...... | G01R 31/318335 702/120 |

OTHER PUBLICATIONS

Dworak, Jennifer, et al., "Board Security Enhancement using New Locking SIB-based Architectures," Proceedings of the IEEE International Test Conference, 2014.

Kim, I.S., et al., "Agent-based honeynet framework for protecting servers in campus networks," IET Information Security, May 22, 2012, vol. 6:3, pp. 202-211.

Lee, Jeremy, et al., "Securing Designs Against Scan-Based Side-Channel Attacks," Dependable Secure Comput., IEEE Trans., vol. 4:4, pp. 325-336, Dec. 2007.

Lee, Jeremy, et al., "Securing Scan Design Using Lock & Key Technique," in Defect and Fault Toloerance in VLSI Systems, DFT 2005, 20th IEEE International Symposium, 2005, pp. 51-62.

Mukhopadhyay, D., et al., "CryptoScan: A Secured Scan Chain Architecture," Proceedings of the 14th Asian Test Symposium, IEEE Computer Society, 2005, pp. 348-353.

Rosenfeld, Kurt, et al., "Attacks and Defenses for JTAG," Des. Test Comput. IEEE, vol. 27:12, Feb. 2010, pp. 36-47.

Yang, Bo, et al., "Scan Based Side Channel Attack on Dedicated Hardware Implementations of Data Encryption Standard," Proceedings of the 2004 Test Conference ITC, 2004, vol. 26, pp. 339-344.

Atobe, Yuta, et al., "Dynamically Changeable Secure Scan Architecture against Scan-Based Side Channel Attack," Int. SoC Des. Conf. ISOCC, Nov. 4-7, 2012, pp. 155-158.

Buskey, Ronald F., et al., "Protected JTAG," Proceedings of the 2006 Int. Conf. on Parallel Processing Workshops, Aug. 14-18, 2006, 8 pp.

Clark, CJ, "Anti-tamper JTAG TAP design enables DRM to JTAG registers and P1687 on-chip instruments," Hardw.-Oriented Secur. Trust HOST 2010 IEEE Int. Symp. on, Jun. 13-14, 2010, pp. 19-24.

Dworak, Jennifer, et al., "Don't Forget to Lock your SIB: Hiding Instruments using P1687," Int. Test Conf., Sep. 2013, pp. 1-10.

Kamal, Abdel Alim, et al., "A Scan-Based Side Channel Attack on the NTRUEncrypt Cryptosystem," 2012 7th Int. Conf. on Availability, Reliability and Security, Aug. 20-24, 2012, pp. 402-409.

Nara, Ryuta, et al., "State-dependent Changeable Scan Architecture against Scan-based Side Channel Attacks," circuit Systems ISCAS Proc. 2010 IEEE Int. Symp. on, May 2010, pp. 1867-1870.

Pierce, Luke, et al., "Enhanced Secure Architecture for Joint Action Test Group Systems," IEEE Transactions on Very Large Scale Integration (VLSI) Systems, vol. 21, No. 7, Jul. 2013, pp. 1342-1345.

Da Rolt, Jean, et al., "Are advanced DfT structures sufficient for preventing scan-attacks?" 2012 IEEE 30th VLSI Test Symposium (VTS), Apr. 23-25, 2012, pp. 246-251.

Sengar, Gaurav, et al., "Secured Flipped Scan-Chain Model for Crypto-Architecture," IEEE Transactions on computer-Aided Design of Integrated Circuits and Systems, vol. 26, No. 11, Nov. 2007, pp. 2080-2084.

* cited by examiner

PROTECTING HIDDEN CONTENT IN INTEGRATED CIRCUITS

CROSS-REFERENCE TO RELATED APPLICATIONS

This application is a non-provisional patent application of and claims priority to U.S. provisional patent application Ser. No. 61/969,220 filed on Mar. 23, 2014 and entitled "Protecting Hidden Content in Integrated Circuits", the contents of which are hereby incorporated by reference in their entirety.

This application is related to U.S. patent application Ser. No. 14/666,281 filed on Mar. 23, 2015 and entitled "Protecting Hidden Content in Integrated Circuits", which is a non-provisional patent application of and claims priority to U.S. provisional patent application Ser. No. 61/969,223 filed on Mar. 23, 2014 and entitled "Protecting Hidden Content in Integrated Circuits", the contents of which are hereby incorporated by reference in their entirety.

STATEMENT OF FEDERALLY FUNDED RESEARCH

This invention was made with government support under grants CCF-1110290 and CCF-1061164 awarded by the NSF. The government has certain rights in the invention.

TECHNICAL FIELD OF THE INVENTION

The present invention relates in general to the field of integrated circuits, and more particularly, to protecting hidden content in integrated circuits.

BACKGROUND OF THE INVENTION

Without limiting the scope of the invention, its background is described in connection with IEEE standards 1149.1 and 1687.

Over the last decade there has been a proliferation in the number and type of on-chip embedded instruments, keys, and data. Some examples include memory and logic built-in self-test controllers (MBIST and LBIST), trace buffers, temperature and delay sensors, voltage and frequency domain controllers, and I/O configuration hardware. They are valuable tools during test, debug, and diagnosis, as well as when portions of the chip (such as the SERDES I/O) need to be configured.

Design for Testability ("DFT") hardware, especially scan chains, are well-known avenues for attackers to gain unauthorized access to internal chip infrastructure. In the case of Joint Test Action Group ("JTAG") ports in typical IEEE 1149.1 scan architectures, this often involves an attacker shifting undocumented instruction encodings into the chain and looking at the chip response. Scan chains may also be harnessed by unauthorized users to capture and read out internal circuit states and break encryption hardware (e.g. [2]-[4]). Thus, some chip providers fuse off the JTAG port after test and before the chip is shipped. Unfortunately, the port can then no longer be used for debug, configuration, or diagnosis.

Many researchers have proposed other methods of protecting the JTAG port and scan chains from attack. Some methods use challenge-response pairs along with hashes or encryption algorithms (e.g. [5]-[8]). Others reorder the scan chain if the first k-bits shifted in don't correspond to a pre-chosen key (e.g. [9], [10]). Other methods disguise chain data by changing it with inversions or XORs [11]-[13]. [14] aims to protect a scan chain by requiring several keys to be scanned into the chain over several cycles during a test initialization phase. The authors of [15] investigated the effect that on-chip DFT hardware, such as response compaction, X-masking etc., could have on the information made available to an attacker and the need for countermeasures. Finally, [16] proposes an open circuit deadlock ("OCD") cell that inserts an open into the scan chain if a SecureRST signal has not been asserted by key checker function hardware.

The IEEE standard 1687 was created to enable efficient access to this hidden content (e.g, embedded instruments, data, keys, etc.) by allowing the scan chain that accesses hidden content to be dynamically reconfigured by opening new chain segments. Unlike IEEE 1149.1, which is instruction-based, this dynamic reconfiguration is controlled by the data shifted through the scan network. For example, FIG. 1 shows a block diagram of a generalized JTAG and IEEE 1687 architecture 100 to access hidden content. The test access port ("TAP") controller 102 receives a test data input ("TDI") signal 104, a test mode select ("TMS") signal 106, a test clock ("TCK") signal 108, and provides a test data output ("TDO") signal 110 (collectively referred to as TAP signals 112). The TAP controller 102 accesses scan cell circuit(s) 114 that provide access to the Test Data Register(s) (TDR) 116 of the hidden content(s) 118.

Although IEEE 1687 supports multiple hardware architectures (i.e., scan cell circuits) through its description language, the network reconfiguration is often controlled by segment insertion bits (SIBs) that allow additional areas of the scan network to be accessed when the correct value is clocked into the SIB's Update cell. For example, FIG. 2 shows a prior art SIB circuit as shown and described in U.S. Pat. No. 8,881,301 (FIG. 5).

Although companies may not object to end users accessing some types of instruments, access to others, such as sensors, trace buffers, scan-dump, and configuration hardware, may be a threat to on-chip IP or safety. Information such as chip IDs and encryption keys should also be made inaccessible to attackers. Alternative methods of protecting instruments in an IEEE 1687 network from unauthorized access are needed.

Often, an attacker with no specific knowledge of the network will scan random data or specific patterns (e.g. walking a one) through it, and will observe the effect on circuit behavior and data captured in the scan cells. In an unprotected IEEE 1687 network, this strategy will allow the attacker to quickly open all SIBs and map the network architecture, obtaining access to all embedded instruments attached to the network.

Accordingly, there is a need to provide better protection of hidden content in integrated circuits from unauthorized access.

SUMMARY OF THE INVENTION

The present invention provides various circuits and methods to provide better protection of hidden content (e.g., embedded instruments, data, keys, etc.) in integrated circuits from unauthorized access.

More specifically, one embodiment of the present invention provides an integrated circuit having a first scan cell segment, a second scan cell segment connected to one or more hidden content, and a scan cell circuit connected to the first scan cell segment and the second scan cell segment. The scan cell circuit alternatively provides access to the first scan cell segment and the second scan cell segment based on a state of the scan cell circuit.

In another embodiment, the integrated circuit may include a first scan cell segment, a second scan cell segment connected to one or more hidden content, and a scan cell circuit connected to the first scan cell segment and the second scan cell segment. The scan cell circuit provides access to the first scan cell segment whenever the state of the scan cell circuit is a first specified state, and the scan cell circuit provides access to the second scan cell segment whenever the state of the scan cell circuit is a second specified state.

In yet another embodiment, the integrated circuit may include a first scan cell segment, a second scan cell segment connected to one or more hidden content, and a scan cell circuit connected to the first scan cell segment and the second scan cell segment. The scan cell circuit alternatively provides access to the first scan cell segment and the second scan cell segment based on a state of the scan cell circuit. In addition, the scan cell circuit requires clocking of a correct key value in each of one or more key bits to change the state of the scan cell circuit.

The present invention is described in detail below with reference to the accompanying drawings.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
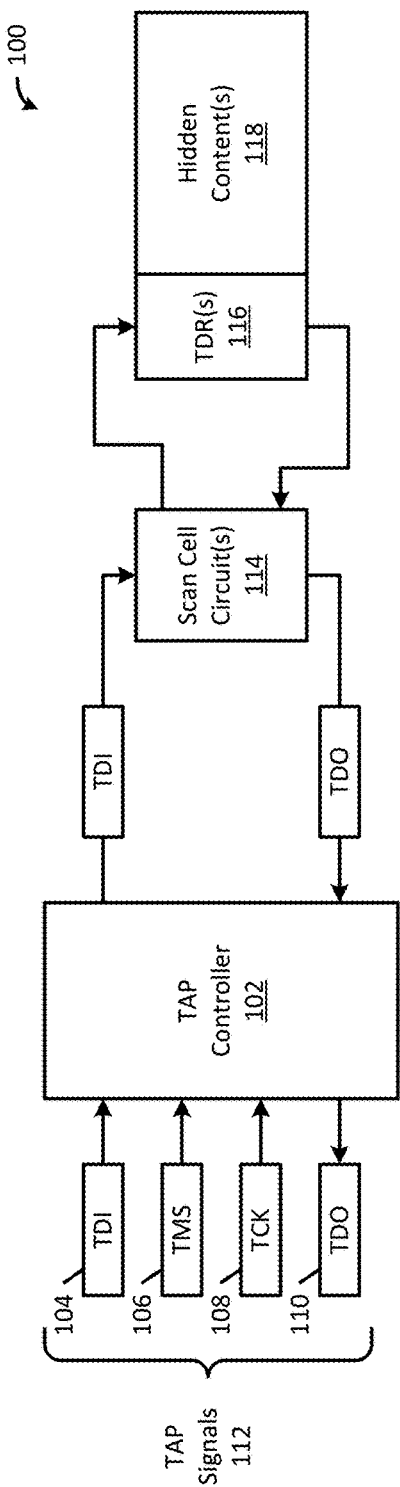
FIG. 1 shows a block diagram of a generalized JTAG and P1687 architecture to access hidden content in accordance with the prior art.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention will be described below in reference to IEEE 1687 scan cell circuits, but the present invention is applicable to other types of scan cell circuits. Traditional scan cell circuits are elements of the scan chain and do not alter the scan chain. IEEE 1687 and 1149.1-2013 scan cell circuits allow the scan chain to be altered to provide or remove access to additional segments of the scan chain and/or hidden content. As a result, the present invention can be incorporated into a network containing traditional scan cell circuits, IEEE 1687 scan cell circuits, IEEE 1149.1-2013 scan cell circuits, newly developed scan cell circuits or any combination thereof.

To prevent an attacker from quickly opening all segment insertion bits ("SIBs") and mapping the network architecture, obtaining access to all embedded instruments attached to the network, Locking SIBs ("LSIBs") were introduced in U.S. Pat. No. 8,881,301. LSIBs use data that is naturally scanned through the network as key bits that must be set to the correct value for the corresponding LSIB to open. As the scan chain length and the number of key bits increases, the expected time required for an attacker to unlock an LSIB increases dramatically.

The concept of Trap bits was also introduced in U.S. Pat. No. 8,881,301. Trap bits, if tripped by an attacker, can prevent him from opening an LSIB even if the correct key is found, and [1] briefly considered the effect of hierarchical network architectures on LSIB security. (Keys are enablers; Traps are disablers.) However, there are many optimizations to a secure IEEE 1687 network protected by LSIBs that were not explored in [1]. For example, responses that an attacker receives from his manipulation of the network can provide misleading information that encourages the attacker to pursue fruitless exploration paths. Other optimizations may reduce or eliminate the transfer of information to the attacker. Here, some of these methods are described and their ability to increase the expected time for an attacker to access hidden instruments are explored.

The present invention builds on the LSIBs introduced in U.S. Pat. No. 8,881,301, and shows how relatively inexpensive modifications to the IEEE 1687 scan network can make the feedback obtained by an attacker less useful. The following discussion describes the impact that switching LSIBs and related techniques can have on the expected time required for an attacker to find a hidden instrument behind a particular LSIB.

Various inventions based on U.S. Pat. No. 8,881,301 will now be described in reference to FIGS. 3-6. The contents of U.S. Pat. No. 8,881,301 are hereby incorporated by reference in its entirety.

Figure 3:
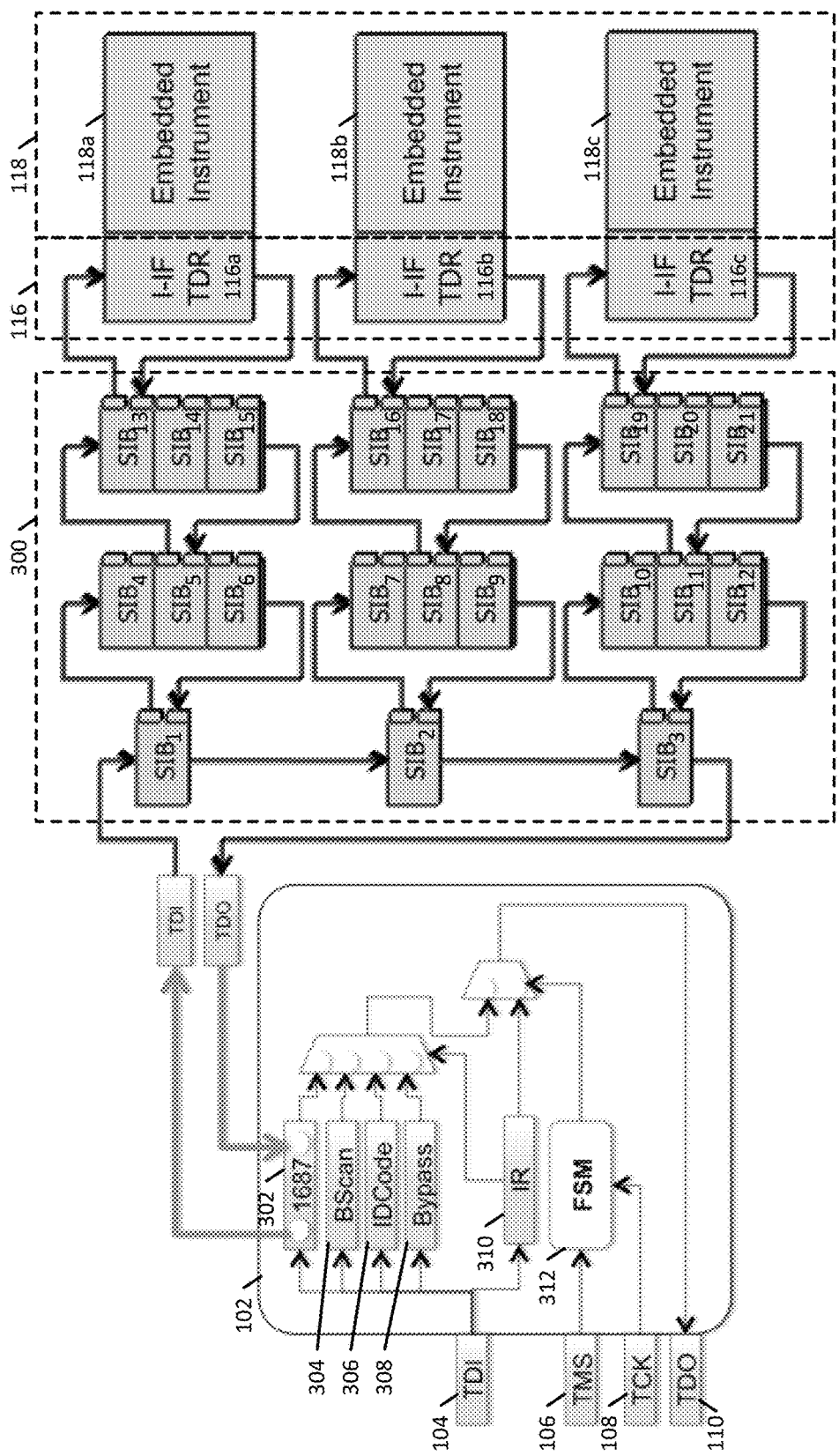
FIG. 3 is a block diagram of a hierarchical IEEE 1687 network accessed with an IEEE 1149.1 TAP controller as shown in U.S. Pat. No. 8,881,301.
Figure 4:
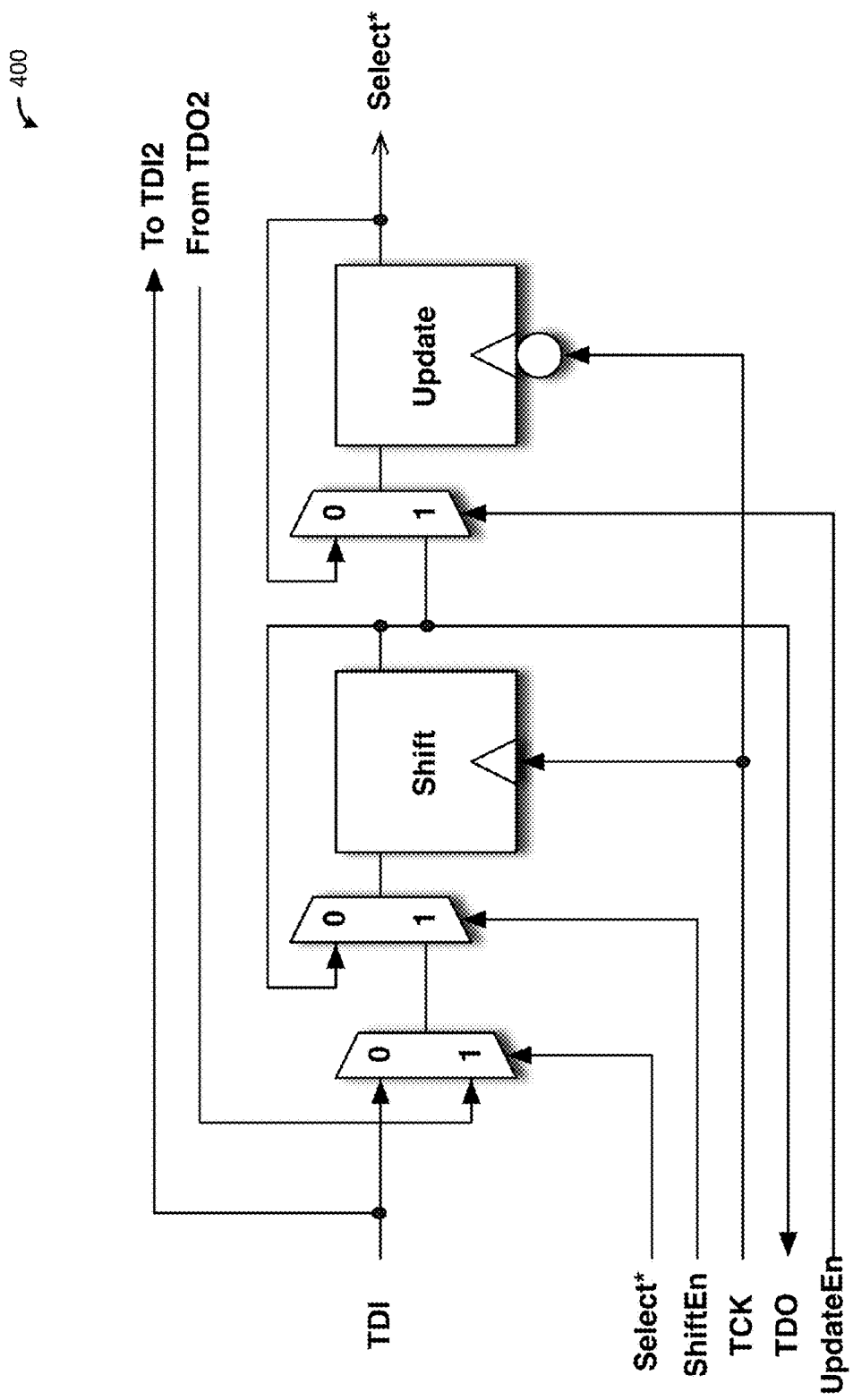
FIG. 4 is a block diagram of a standard SIB implementation as shown in U.S. Pat. No. 8,881,301.

Now referring to FIGS. 3 and 4, a block diagram of a hierarchical IEEE 1687 scan network 300 that allows access to embedded instruments 118 by opening and closing SIBs is shown. An example of a standard SIB implementation 400 used in the hierarchical IEEE 1687 scan network 300 is shown in FIG. 4. When a SIB is open, it allows access to a new segment of the scan network 300. When the SIB is closed, it bypasses that segment, making the overall scan path shorter. Accessing each instrument 118*a*, 118*b* or 118*c* requires opening 3 SIBs. [1]

As used herein, an open scan cell circuit gives, allows or provides access to any hidden content, scan cell chains or networks protected by the scan cell circuit. In other words, the scan cell circuit is a gateway that is either open or closed. Unlike [16], an open scan cell circuit does not interrupt the serial data path. A closed scan cell circuit prevents access to any hidden content, scan cell chains or networks protected by the scan cell circuit. For example, if $SIB_1$ is closed, $SIB_2$ is closed and $SIB_3$ is closed, the serial data path only includes $SIB_1$, $SIB_2$ and $SIB_3$. If, however, $SIB_1$ is open, $SIB_4$, $SIB_5$ and $SIB_6$ are inserted into the serial data path. If $SIB_5$ is also open, $SIB_{13}$, $SIB_{14}$ and $SIB_{15}$ are inserted into the serial data path. If $SIB_{13}$ is also open, TDR 116a is inserted into the serial data path and access to embedded instrument 118a is provided. As a result, accessing embedded instrument 118a requires opening $SIB_1$, $SIB_5$ and $SIB_{13}$.

The IEEE 1149.1 TAP controller 102 for an IEEE 1687 network 300 includes several items, such as one or more IEEE 1687 gateway registers 302, a boundary scan register 304, a standardized identification code register 306, a bypass register 308, an instruction register 310, and an IEEE 1149.1 finite state machine 312 that dictates the sequence and event-order of operations conducted by the registers. The IEEE 1687 gateway register 302 provides access to the IEEE 1687 network 300 and the embedded instruments 118 within. Opening and closing the SIBs can dynamically reconfigure the IEEE 1687 network 300.

When the SIB 400 is closed, the value in the Update cell and thus the value of both Select* signals is equal to 0. (The Select* signals are connected.) When closed, data passes from the TDI input to the shift cell, and from the shift cell to TDO on the rising-edge of TCK when the IEEE 1149.1 state machine is in the ShiftDR state (ShiftEn=1). If all the SIBs in FIG. 3 were closed, the IEEE 1687 scan network 300 would appear to contain only three scan cells, the three SIBs on the far left of the hierarchy. To allow access to a new area of the network 300, including the embedded instruments 118, one or more SIBs must be opened. For example, accessing the instrument 118a requires opening 3 SIBs.

Figure 2:
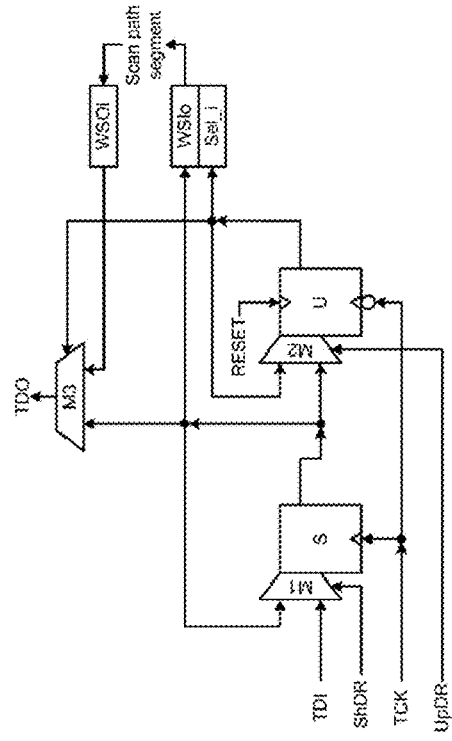
FIG. 2 shows a block diagram of a exemplary SIB circuit in accordance with the prior art.

Opening the SIB 400 occurs when a value of 1 is clocked into the Update Register on the falling edge of TCK when the 1149.1 state machine is in the UpdateDr state (UpdateEn=1). This allows Select* to be set to 1. The Select* serves as an enable for cells in the new chain segment between TDI2 and TDO2. The value from TDO2 will be clocked into the shift cell when the IEEE 1149.1 state machine is in the ShiftDR state, and the data at the TDI input will be passed to the new chain segment through TDI2. Once a new value is put in the Update cell, that value remains until the state machine again executes an UpdateDR or until Global Reset is asserted. Also note that the SIB 400 is only one example of a SIB. Other variations (such as opening the SIB when the Update Cell is equal to 0 or inserting the new chain after the SIB as in FIG. 2) are possible.

IEEE 1687 is especially useful for handling large numbers of instruments that would be difficult under normal IEEE 1149.1. For example, an IEEE 1687 serial access network may contain 200 memory BISTs, each behind a SIB, and the BISTs may be organized by SIBs into 20 groups of 10. The initial (minimum) scan path would be 20 bits long. When one SIB is opened, it adds 10 SIBs to the scan path, and when one of those SIBs is opened, it provides access to the BIST Interface Test Data Register (TDR). This architecture allows any selection of BISTs to be accessed and operated simultaneously, allowing adjustments in real-time to fit within power, noise, or thermal budgets.

Figure 5:
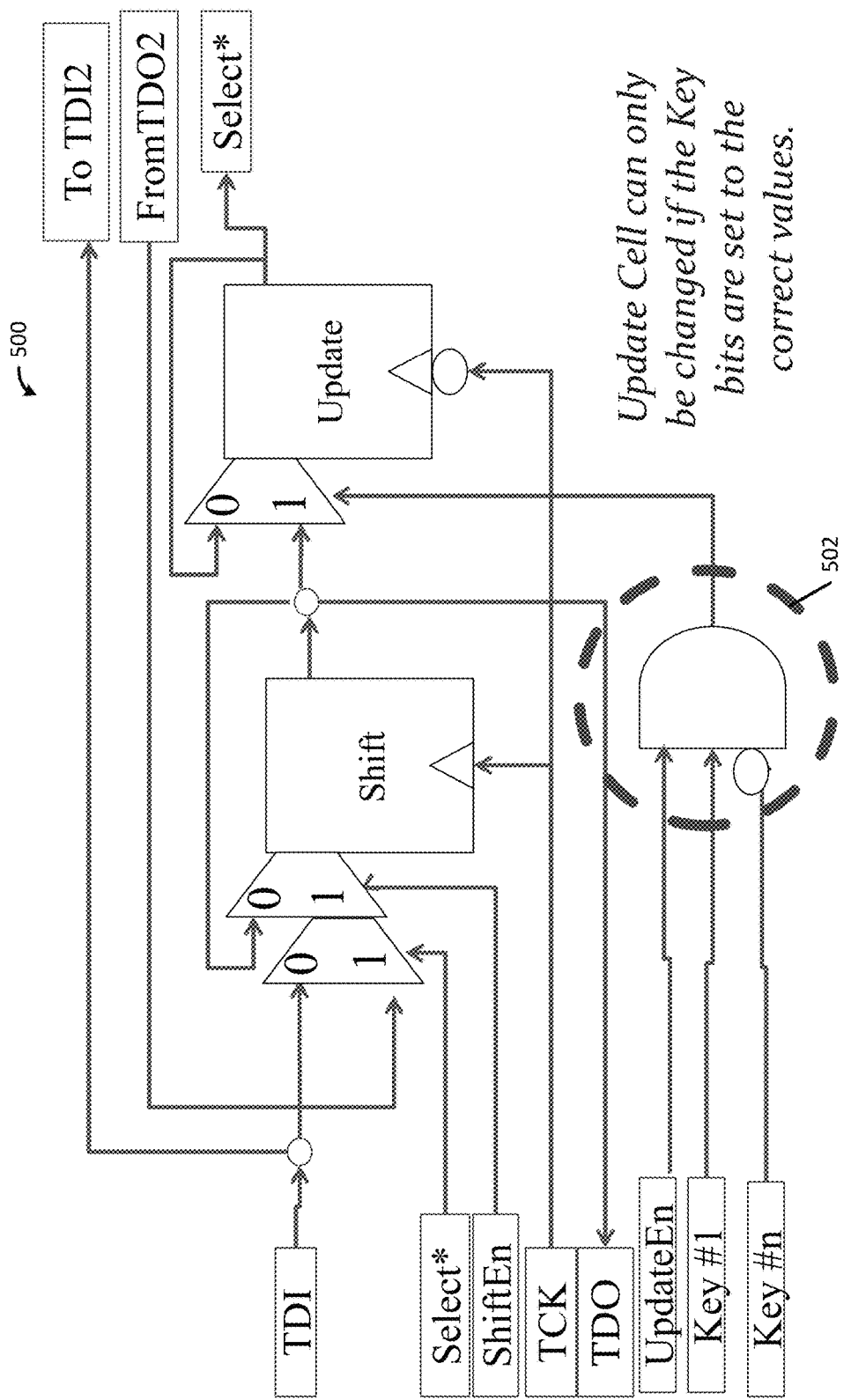
FIG. 5 is a block diagram of a locking SIB implementation based on U.S. Pat. No. 8,881,301.

Referring now to FIG. 5, a locking SIB ("LSIB") 500 based on U.S. Pat. No. 8,881,301 is shown. The LSIB 500 is created from a SIB 400 (FIG. 4) by gating the Update signal, UpdateEn, with a set of n key bits ("Key #1" through "Key #n"). The key bits correspond to values in other predefined scan cells in the IEEE 1687 network or other sources as will be described below. Opening an LSIB 500 requires not only clocking the correct value into the Update cell, but also scanning the correct data into the key bits in the chain. Note that although FIG. 5 shows a set of key bits AND'ed together (see circle 502) that would appear on every chip instance, it is possible to use E-fuses or programmable logic to make the conditions required for an LSIB to open vary from one chip to another. Note also that other types of logic circuits can be used to accomplish the same functionality.

Although IEEE 1687 does not mandate that an IEEE 1149.1 TAP controller drive the scan control signals, in many cases an IEEE 11491.1 TAP is likely to be used, and an attacker may need to utilize the IEEE 1149.1 state machine to execute capture, shift, and update functions. The following discussion will assume control of an IEEE 1687 network through an IEEE 1149.1 TAP. This means that multiple clock cycles are required to execute guesses that involve filling the chain with random data, assert control signal UpdateDR (Update Data Register), and then check the length of the chain. Note that changing the protocol by which the IEEE 1687 network is accessed will change details about how guesses are made and how long they will take, but the present invention will still be applicable.

Figure 6:
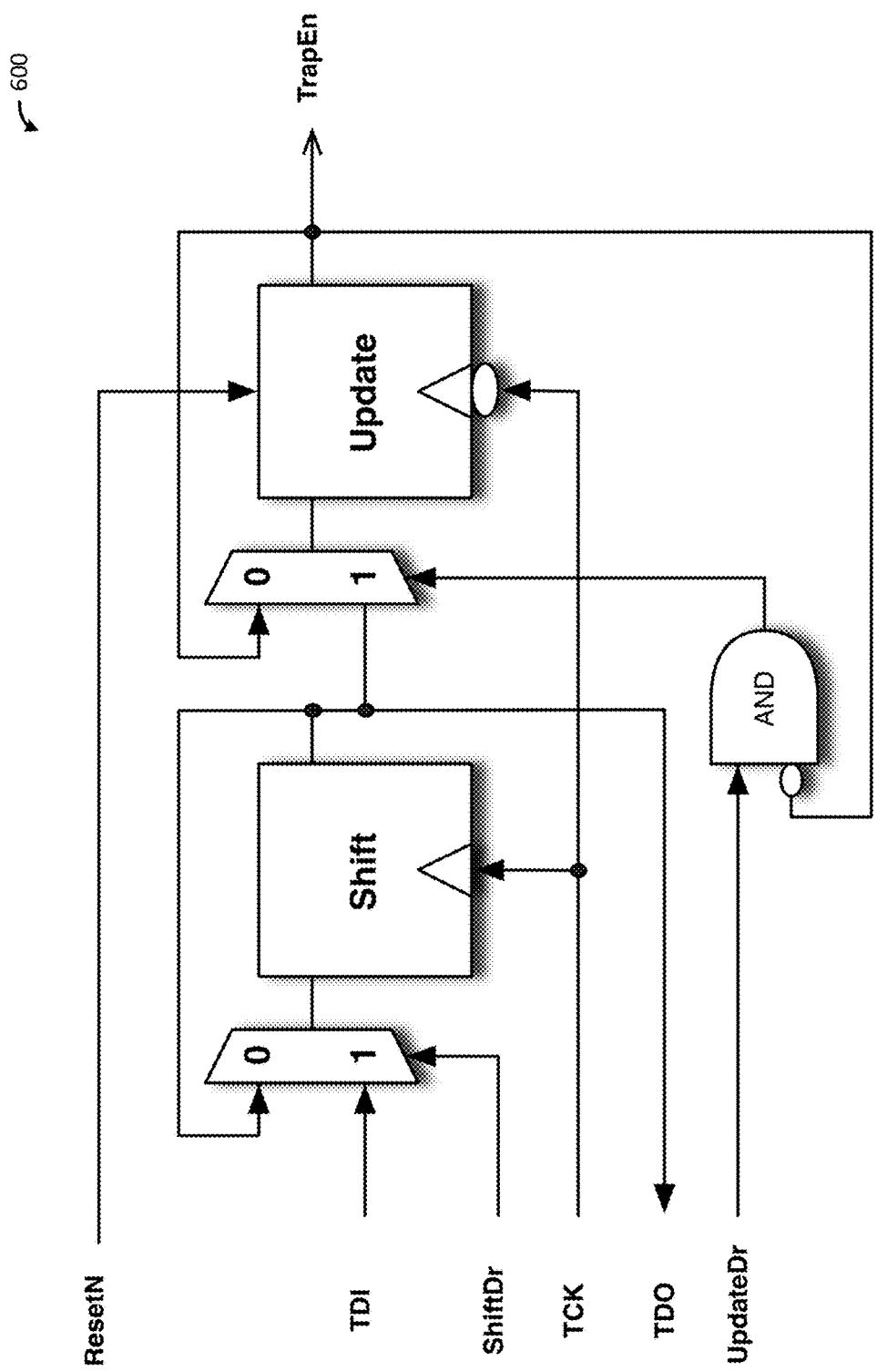
FIG. 6 is a block diagram of a SIB implementation having a trap bit based on U.S. Pat. No. 8,881,301.

Now referring to FIG. 6, a SIB having a trap bit 600 is shown. Trap bits were also introduced in U.S. Pat. No. 8,881,301. A trap bit asserts a Trap-Enable signal when the trigger value is written to the bit's Update cell. For example, a positive logic TrapEn signal may be inverted and fed into the AND gate shown in FIG. 5 to keep the target SIB or LSIB that hides an instrument from ever opening. The trap bit logic contains internal feedback so that once the trap is asserted, it can only be de-asserted by asserting reset. If the trap bit is reset using the 1149.1 Test Logic Reset ("TLR") state, this effectively doubles the expected time for an attacker to open an LSIB by requiring a pass through the TLR state at the start of every guess to clear all possible previously tripped traps. The actual time will vary depending on details regarding how the instruction register is refilled (if it has to be) and the relative lengths of the chains.

In [1], it was assumed that an attacker would enter a random vector into the scan chain as a "guess" to try to open an unknown LSIB. Without knowledge of the network, a random guess is likely to be among the best choices, as it reduces bias. The network interrogation process would check the chain length after each guess, and an increase in length would indicate that a new chain segment had opened—potentially providing new access to additional instrument TDRs (test data registers), LSIBs, or keys. Leaving aside the possibility of power analysis, imaging, or physical delamination of the part, the attacker is faced with a black box problem and limited to observing data exiting the chip pins. The most visible feedback is to note a change in the length of the scan path. Various embodiments of the present invention reduce the information present in such feedback by making it complicate the attacker's strategy or by removing that feedback entirely.

Figure 7:
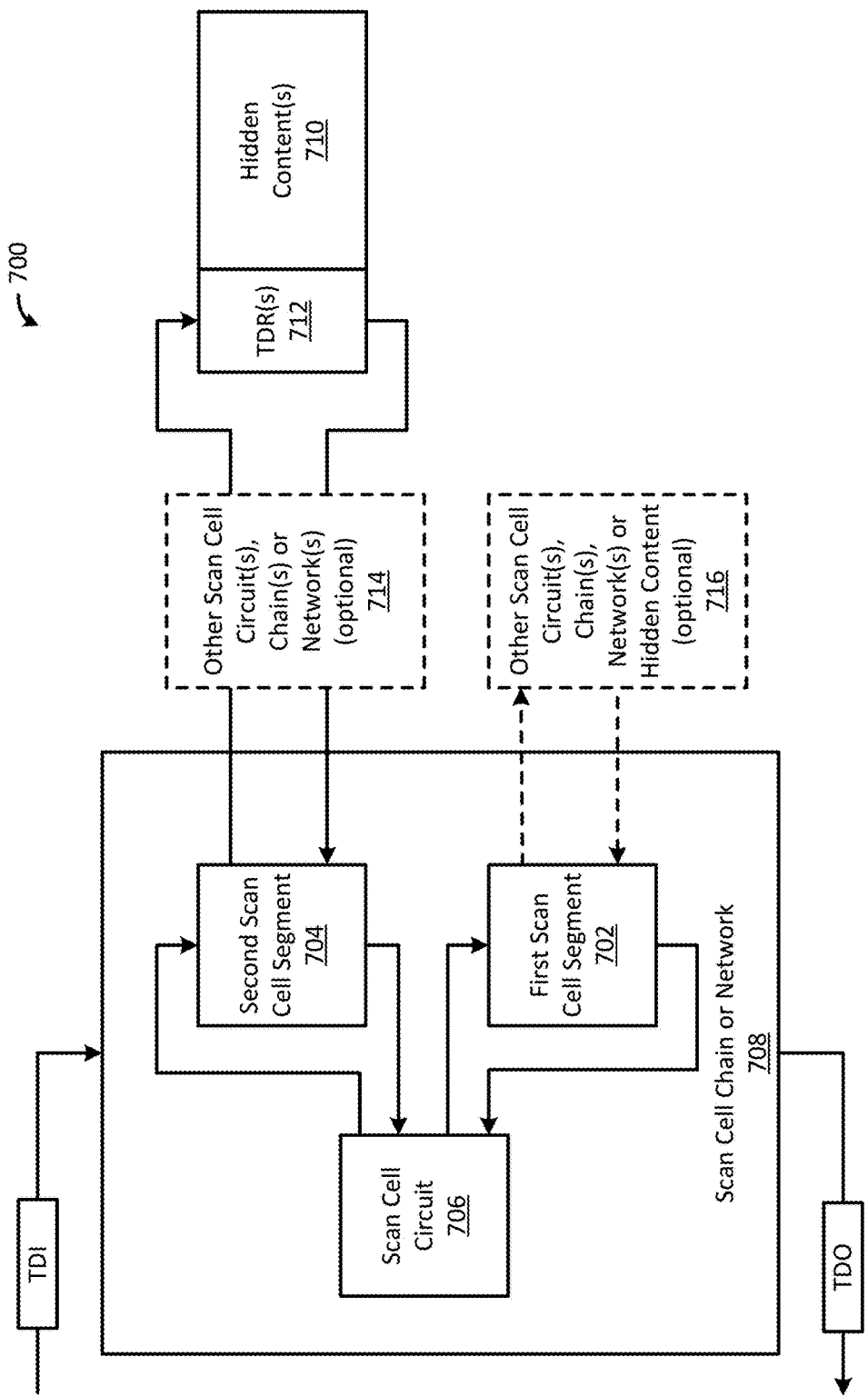
FIGS. 7-10 are block diagrams of various switching LSIBs in accordance with another embodiment of the present invention.

Referring now to FIG. 7, a block diagram of an integrated circuit 700 in accordance with one embodiment of the present invention is shown. The integrated circuit 700 includes a first scan cell segment 702, a second scan cell segment 704, and a scan cell circuit 706 connected to the first scan cell segment 702 and the second scan cell segment 704. The scan cell circuit 706 forms all or part of a serial data path between TDI and TDO. The scan cell circuit 706 can be the only scan cell circuit or be part of a scan cell chain or network 708. The second scan cell segment 704 is connected to at least one of the one or more hidden content 710 accessible through a TDR 712. The scan cell circuit 706 alternatively provides access to the first scan cell segment 702 and the second scan cell segment 704 based on a state of the scan cell circuit 706.

The scan cell circuit 706 provides access to the first scan cell segment 702 by inserting the first scan cell segment 702 into the serial data path. The scan cell circuit 706 provides access to the second scan cell segment 704 by inserting the second scan cell segment 704 into the serial data path. The second scan cell segment 704, when it is in an open state, provides access to the at least one of the one or more hidden content 710 by inserting the at least one of the one or more hidden content 710 into the serial data path, and when it is in a closed state, prevents access to the at least one of the one or more hidden content 710 by removing the at least one of the one or more hidden content 710 from the serial data path. Note that the first scan cell segment 702 and the second scan cell segment 704 do not interrupt the serial data path when they are in a closed state.

Other scan cell circuits, chains or networks 714 can be connected between the second scan cell segment 704 and the at least one of the one or more hidden content 710. Similarly, the first scan cell segment 702 can also be connected to other scan cell circuits, chains, networks or hidden content 716. In this case, the first scan cell segment 702 provides access to other scan cell circuits, chains, networks or hidden content 716 whenever the first scan cell segment 702 is in an open state state and prevents access to the other scan cell circuits, chains, networks or hidden content 716 whenever the first scan cell segment 702 is in a closed state. In some embodiments, a first hidden content 710 contains a first data that is useful in an operation of the integrated circuit, and a second hidden content 716 contains a second data that is not useful in the operation of the integrated circuit. The first hidden content 710 may have a first interface size and the second hidden content 716 may have a second interface size, which can be equal to the first interface size.

In one example, the scan cell circuit 706 provides access to the first scan cell segment 702 whenever the state of the scan cell circuit 706 is a first specified state, and provides access to the second scan cell segment 704 whenever the state of the scan cell circuit 706 is a second specified state. The first scan cell segment 702 can be a single segment insertion bit circuit or a single scan cell circuit. The second scan cell segment 704 can be a single locking segment insertion bit circuit or a single locking scan cell circuit. The one or more hidden content 710 can be one or more embedded instruments, or keys, or traps, or serial registers, or data.

In another example, the scan cell circuit 706 requires clocking of a correct key value in each of one or more key bits to change the state of the scan cell circuit 706. Clocking of a correct update value in an update cell may also be required. The correct key value can be a correct first value in each of one or more key bits to switch the segment insertion bit circuit to provide access to the first scan cell segment 702, and a correct second value in each of one or more key bits to switch the segment insertion bit circuit to provide access to the second scan cell segment 704. The correct first value may or may not be equal to the correct second value. An embedded instrument, or a function logic circuit, or a memory, or a register, or a decryption circuit, or a circuit input, or bits shifted into a serial data path, or a combination thereof can generate the correct key value. An embedded instrument, or a function logic circuit, or a memory, or a register, or a decryption circuit, or a circuit input, or bits shifted into a serial data path, or a combination thereof can generated a key value clocked into each of the one or more key bits that is then compared to the correct key value. A value to correctly set each key bit can be changed based on an operational history of the integrated circuit.

The integrated circuit can also include a counter connected to the one or more key bits, wherein the counter must contain a specified value to operate the segment insertion bit circuit or access the at least one of the one or more hidden content. The specified value can be less than or greater than a threshold value. In some embodiments, the counter only increments when each of the one or more key bits is correctly set. In other embodiments, a value to correctly set each of the one or more key bits changes or does not change on successive capture passes, or shift passes, or update passes, or shift and update passes. The counter can be a capture counter, or a scan shift counter, or an update counter, or a scan shift and update counter.

When the counter is a scan shift counter, the scan shift counter typically must contain a specified shift value before clocking of the correct update value in an update cell to operate the segment insertion bit circuit or access the at least one of the one or more hidden content. When the segment insertion bit circuit is part of a chain or network of scan cell circuits, the specified shift value can be less than a current length of the chain of scan cell circuits, or greater than a required length of the chain of scan cell circuits, or depend on a current configuration of the network of scan cell circuits. The specified shift value can be changed based on an operational history of the integrated circuit. The operational history of the integrated circuit can be stored in a nonvolatile memory. The operational history can be reset whenever a power to the integrated circuit is turned on, or a specified update value is clocked into the update cell. The operational history can correspond to a sequence of previously applied test signals, or a sequence of previously applied data signals, or a sequence of previously applied functional signals, or a sequence of previously applied control signals, or a sequence of scan cell circuits that have been opened or closed, or a value of a real time clock, or a combination thereof. The operational history can be reset with a pre-selected set of operations. Moreover, the specified shift value can be changed each time an update is applied, or a shift enable signal toggles, or an update-enable signal toggles, or a capture-enable signal toggles, or a combination thereof.

The integrated circuit 700 may also include one or more trap bits within the network or chain of scan cell circuits 708 that prevent a change of the state of the scan cell circuit 706. In such a case, the second scan cell segment 704 can be a locking segment insertion bit circuit and further include one or more trap bits within the network or chain of scan cell circuits 708 that prevent the state of the locking segment insertion bit circuit from being changed. Likewise, the integrated circuit 700 may further include a pair of scan cell circuits (e.g., honeytraps, etc.) placed in equivalent locations in both the first scan cell segment 702 and the second scan cell segment 704, wherein a change in a status of one of the scan cell segments causes a corresponding change in a status of the other scan cell segment.

In some embodiments, the scan cell circuit 706 automatically switches to provide access to the first scan cell segment 702 or prevents the state of the scan cell circuit 706 from being changed whenever one or more conditions are detected. The one or more conditions may include a circuit reset, a specified data from a real time clock, a specified time period since the first scan cell circuit was changed to the first specified state, a specified number of clock cycles since the first scan cell circuit was changed to the first specified state, a specified number of shift cycles since the first scan cell circuit was changed to the first specified state, a specified number of shift-update cycles since the first scan cell circuit was changed to the first specified state, a specified number of capture cycles since the first scan cell circuit was changed to the first specified state, a specified number or set of shift signal toggles, a specified number of capture signal toggles, a specified number of update signal toggles, a data read or produced by an embedded instrument, a specified data obtained from a geographic location signal, a data obtained from a wireless connection, a data obtained from one or more inputs of the integrated circuit, or a combination thereof.

Providing No Feedback: Hiding an Increase or Decrease in Chain Length

Figure 8:
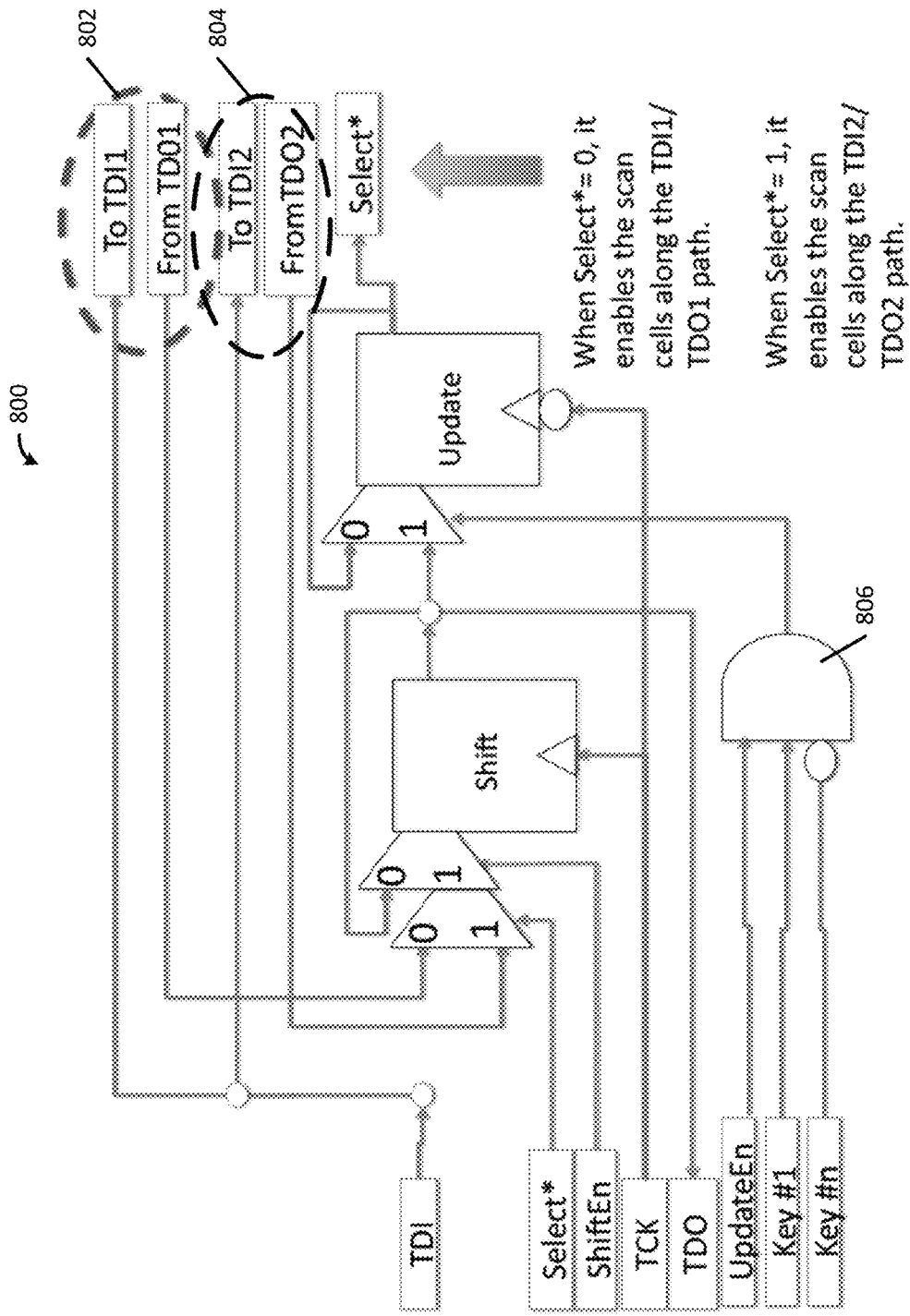
Figure 9:
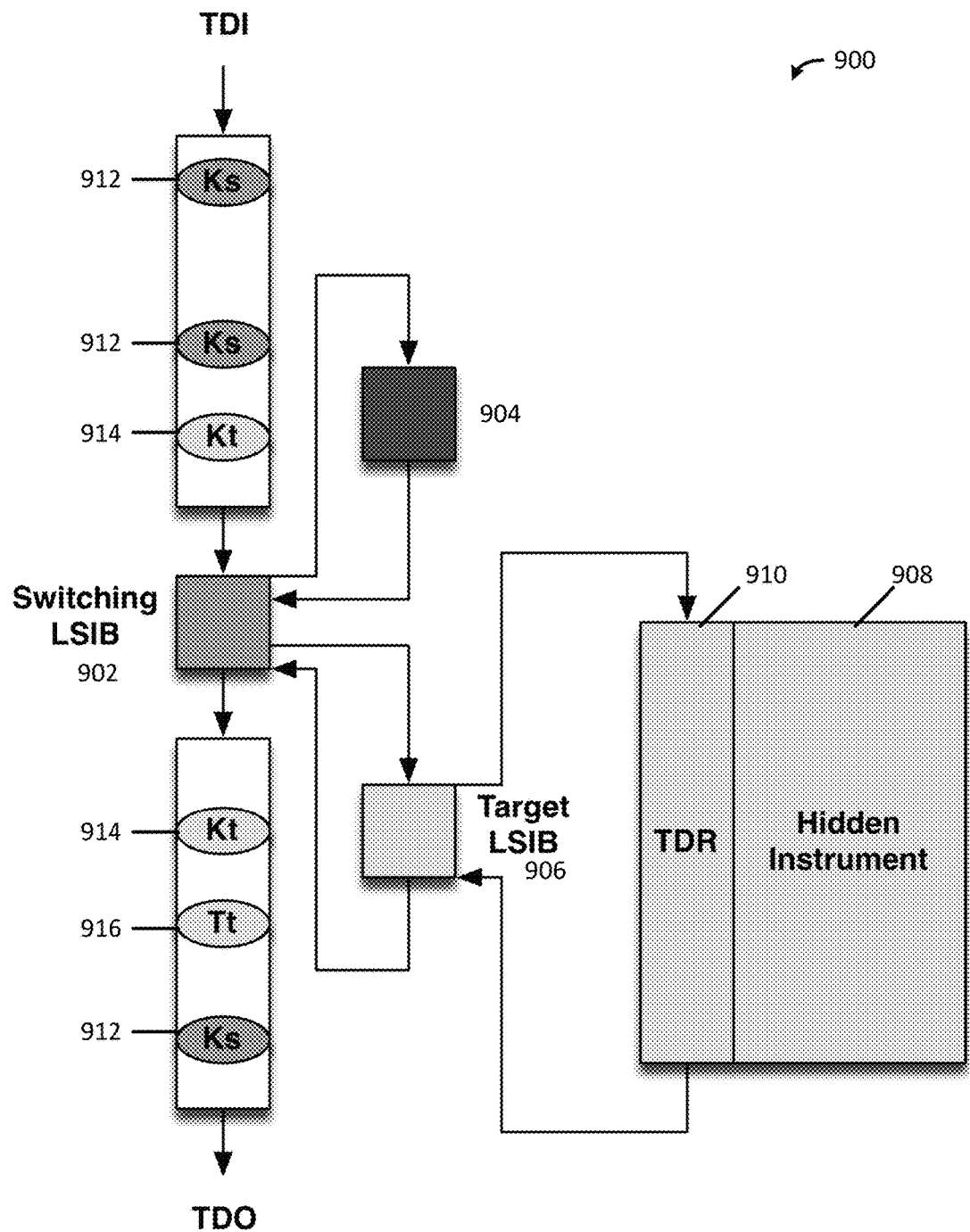

It has been assumed that an attacker will use the chain length as an indicator of whether a new area of the chain has been opened (or closed). A slight modification to the design of an LSIB can very inexpensively remove this information. Consider FIG. 8, which contains an example schematic for a "Switching LSIB" (SLSIB) 800. Instead of opening or closing a single segment of the chain, it switches between two segments. When a logic 0 is clocked into the Update cell of the SIB, the first segment (see circle 802) is accessible. When a logic one is clocked into the LSIB Update cell, the 2nd segment (see circle 804) is available instead. Obviously, the two segments could be of any length. However, in this application, a length of 1 can be used to reduce the overall overhead, as shown in FIG. 9. Note also that a "Switching SIB" (SSIB) can be used by removing the AND gate 806 and key bits.

Figure 10:
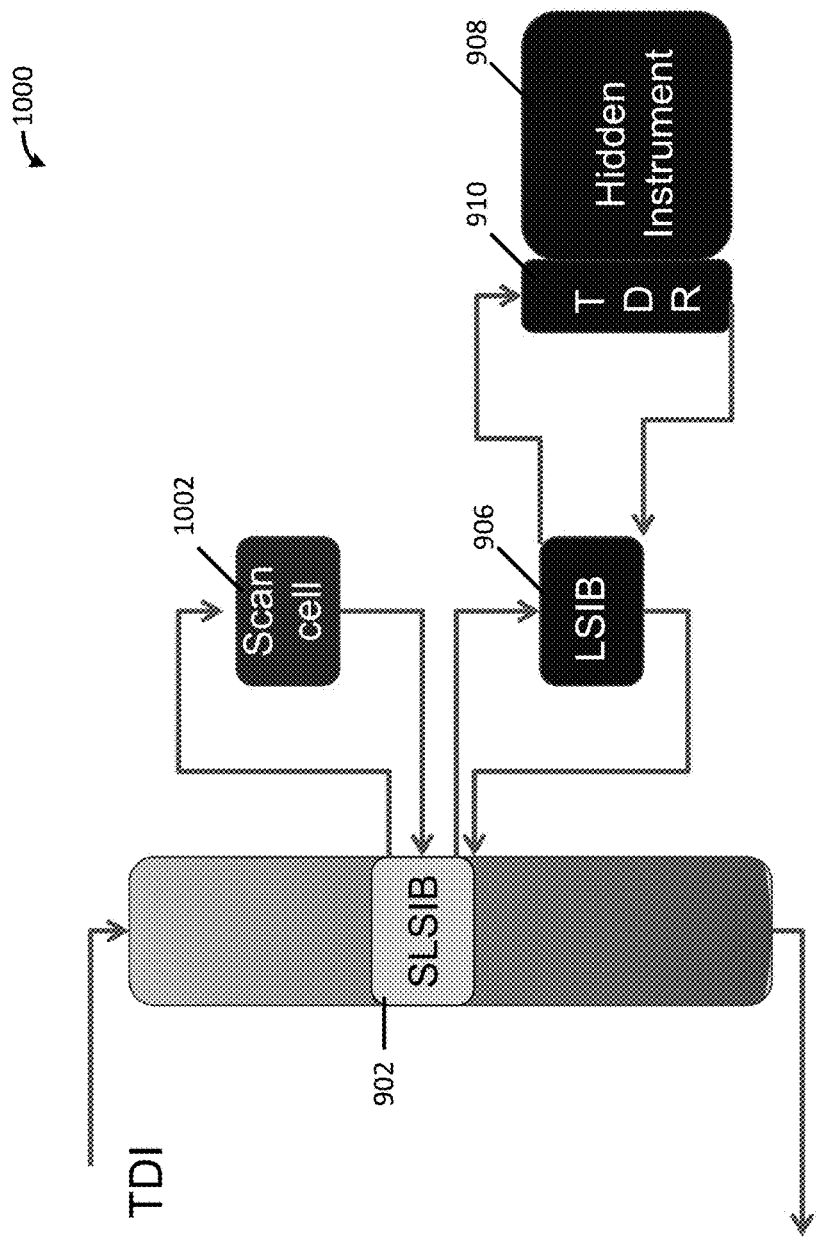

Now referring to FIG. 9, a network 900 is shown where one of the two paths accessible by the SLSIB 902 leads to a dead-end 904, while the other path leads to an LSIB 906 that allows access to a broader area of the network, including a hidden instrument 908 via TDR 910. Initially, the SLSIB 902 should be set to access the dead-end portion 904 of the network. Even if the attacker manages to find the correct key bits for the SLSIB 902 and cause it to switch, he will not see any difference because the new path (consisting of a single LSIB) is exactly the same length. Note that the capture cell for the scan cells in both paths should be fed by the same signal so they look the same during Capture and Shift. The key bits (K) 912 in the chain are needed to switch the SLSIB 902. The key bits (K) 914 in the chain are needed to open the target LSIB 906. Triggering the trap bit (T) 916 with the first pattern will prevent the target LSIB 906 from opening on a second pattern. FIG. 10 shows an additional representation of the SLSIB 1000 in which the dead-end is a scan cell 1002.

In other words, the present invention provides an integrated circuit 900 that includes one or more hidden content 908, a first scan cell circuit 906, a second scan cell circuit 904 and a third scan cell circuit 902. The first scan cell circuit 906 is connected to at least one of the one or more hidden content 908 and provides access to the at least one of the one or more hidden content 908 whenever the first scan cell circuit 906 is open and not disabled. The third scan cell circuit 902 is connected to the first scan cell circuit 906 and the second scan cell circuit 904, and: (1) enables access to the first scan cell circuit 906 and disables access to the second scan cell circuit 904 whenever a first value is clocked in an update cell; and (2) disables access to the first scan cell circuit 906 and enables access to the second scan cell circuit 904 whenever a second value is clocked in the update cell. In addition, a logic circuit (e.g., a small counter, etc.) can be added to the first scan cell circuit, the second scan cell circuit, the third scan cell circuit, any combination thereof or other circuitry connected thereto that requires more than one scan and update cycle after a reset before the first scan cell circuit or the second scan cell circuit will open.

From the attacker's viewpoint, this means that he must start applying two-pattern tests. Each initial guess could have opened a SLSIB, but as long as both the dead-end cell and the target LSIB are set to receive the same data on CaptureDR, the attacker doesn't know if he made a switch. The attacker must scan in an initial guess and perform an UpdateDR. He must then scan in a second pattern, which may possibly open an LSIB if the SLSIB was switched for the first pattern, and check the chain length. If unsuccessful, he must execute a network reset (to clear any Trap bits) and try again. In some ways, this is similar to the cost of a hierarchical scan structure where two LSIBs must be opened in sequence for hidden instrument access.

However, deterministically opening the SLSIB repeatedly on each try is not possible because opening the SLSIB provides no information to the attacker. A random guess must be used for both patterns every time.

In the alternative hierarchical case described in [1], where either key bits or a second LSIB lie behind the first LSIB, because the attacker can see the effect of the first LSIB opening, once he finds the LSIB, he can find the key bits for it with the method described in [1]. He can then deterministically open it on each new guessing attempt.

The SLSIB is also better than a single LSIB with the same number of key bits. Each SLSIB requires at least one additional pass through the chain and state machine on each guess, and the same physical key-bits can be reused on multiple passes (with different key values). Furthermore, if the attacker is not aware that SLSIBs are a possibility and only applies one-pattern tests interspersed with resets, he will never open the LSIB behind the SLSIB. His attack can be made even more difficult by cascading an arbitrary number of multiple SLSIBs behind each other such that he does not know how many patterns are needed. Finally, if Trap Bits associated with the target LSIB are present in the original chain, then scanning through that chain multiple times with different patterns will provide multiple opportunities to trip each of the traps when SLSIBs are cascaded.

Other embodiments include: (1) the LSIBs may have two different sets of key bits (one required to switch it one way and another required to switch it back); or (2) a cascading string of switching LSIBs with the target LSIB at the end of the string can be particularly useful, especially if multiple trap bits are present on a level of the network that is scanned repeatedly.

In another embodiment of the proposed invention, the integrated circuit could correspond to a 3D stacked IC. A 3D stacked IC consists of multiple dies that are stacked vertically and are generally connected together by through-silicon-vias (TSVs). Such a stack could consist of multiple types of dies and logic, including analog circuitry, processors and controllers, memories, and programmable logic, such as FPGAs. Just as in the case of a 2D IC, a 3D stacked IC could easily be designed to contain a scan network that contains SIBs, LSIBs, locks, traps, switching LSIBs, etc. for testing, configuration, debug, and embedded instrument access. However, because the interdie communication through TSVs in a 3D stacked IC cannot be directly probed without destroying the stack, additional reduction in attacker feedback is possible in 3D than in 2D. In particular, it can be made difficult or impossible for an attacker to observe the exact sequences shifted into and out of the scan network by restricting those sequences to being generated and possibly analyzed only by circuitry within the stack itself.

For example, one of the dies in the stack may be used as a test controller or test pattern generator to generate the communication bitstream sequences needed to open a sequence of LSIBs to access hidden content, such as embedded instruments. This test controller may contain a complicated authentication protocol to restrict access to the controller's functions to only authorized users. It may reside in programmable logic on an FPGA, in dedicated circuitry, or in software that runs on a processor resident in the stack. The hardware or software used to create/run the test controller may itself reside in an encrypted or obfuscated form in an external memory or in the stack itself. A significant advantage of this approach is that it allows different IP owners to create custom software or firmware for accessing their own IP, such as their own die, while automatically restricting access to other IP owners of other dies in the stack. The presence of keys, LSIBs, honeytraps, etc., in the network is still needed to prevent an attacker with direct access to a bare die before the stack is assembled or internal access to TSVs (such as through Trojan circuitry) from investigating the scan network by running scan shift sequences through the chains and observing results. However, the fact that, in general, the actual communication bitstreams will reside within the stack itself means that even less information regarding the scan network design and contents, may be available to a more conventional attacker, even one with valid licensed software used to access the scan network, than in the 2D case.

Accordingly, the one or more hidden content, the scan cell circuit, the first scan cell segment and the second scan cell segment can be disposed within a set of vertically stacked and electrically connected semiconductor dies. A controller disposed on a first semiconductor die accesses the scan cell circuit disposed on a second semiconductor die. The controller can be a test controller, a debug controller or a configuration controller. Moreover, the test controller can be a programmable logic circuit, or a dedicated logic circuit, or a processor, or a combination thereof. The test controller can use an authentication protocol to determine what data can be accepted from and given to a user. A bitstream can be stored on a third semiconductor die that operates the scan cell circuit. The programming bitstream for the test controller can allow an authorized user to access or disable access to a proprietary data within the set of vertically stacked and electrically connected semiconductor dies. The programming bitstream can be stored in an encrypted or obfuscated form in an external memory. Moreover, the programming bitstream can be stored within the set of vertically stacked and electrically connected semiconductor dies.

The foregoing embodiments and techniques can significantly increase the cost an attacker faces when trying to investigate an IEEE network containing LSIBs. Although they will not prevent all possible attackers, they can make it less likely that all but the most dedicated attackers will find the hidden instruments by scanning data through the network while using the studied attack modes.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

The word "exemplary" is used herein to mean "serving as an example, instance, or illustration." Any embodiment described herein as "exemplary" is not necessarily to be construed as preferred or advantageous over other embodiments.

As used in this specification and claim(s), the words "comprising" (and any form of comprising, such as "comprise" and "comprises"), "having" (and any form of having, such as "have" and "has"), "including" (any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or items, such as BB, AAA, AB, BBC, AAABCCCC, CBBAAA, CABABB, and so forth. The skilled artisan will understand that typically there is not limit on the number of item or items in any combination, unless otherwise apparent from the context.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

All publications and patent applications mentioned in the specification are indicative of the level of skill of those skilled in the art to which this invention pertains. All publications and patent applications are herein incorporated

REFERENCES

[1] Jennifer Dworak, Al Crouch, John Potter, Adam Zygmontowicz, and Micah Thornton, "Don't Forget to Lock your SIB: Hiding Instruments using P1687," in *Proceedings of the IEEE International Test Conference*, 2013.
[2] D. Mukhopadhyay, S. Banerjee, D. Roychowdhury, and B. B. Bhattacharya, "CryptoScan: A Secured Scan Chain Architecture," *Test Symp.* 2005 *Proc. 14th Asian*, pp. 348-353, 18.
[3] A. A. Kamal and A. M. Youssef, "A Scan-Based Side Channel Attack on the NTRUEncrypt Cryptosystem," *Availab. Reliab. Secur. ARES* 2012 *Seventh Int. Conf. On*, pp. 402-409, 20.
[4] Bo Yang, Kaijie Wu, and R. Karri, "Scan based side channel attack on dedicated hardware implementations of Data Encryption Standard," *Test Conf* 2004 *Proc. ITC* 2004 *Int.*, pp. 339-344, 26.
[5] R. F. Buskey and B. B. Frosik, "Protected JTAG," *Parallel Process. Workshop* 2006 *ICPP* 2006 *Workshop* 2006 *Int. Conf. On*, p. 8pp.-414, 2006.
[6] C. J. Clark, "Anti-tamper JTAG TAP design enables DRM to JTAG registers and P1687 on-chip instruments," *Hardw.-Oriented Secur. Trust HOST* 2010 *IEEE Int. Symp. On*, pp. 19-24, 2010.
[7] K. Rosenfeld and R. Karri, "Attacks and Defenses for JTAG," *Des. Test Comput. IEEE*, vol. 27, no. 1, pp. 36-47, February 2010.
[8] L. Pierce and S. Tragoudas, "Enhanced Secure Architecture for Joint Action Test Group Systems," *Very Large Scale Integr. VLSI Syst. IEEE Trans. On*, vol. PP, no. 99, pp. 1-1, 2012.
[9] J. Lee, M. Tehranipoor, C. Patel, and J. Plusquellic, "Securing Designs against Scan-Based Side-Channel Attacks," *Dependable Secure Comput. IEEE Trans. On*, vol. 4, no. 4, pp. 325-336, December 2007.
[10] J. Lee, M. Tehranipoor, C. Patel, and J. Plusquellic, "Securing Scan Design Using Lock and Key Technique," in *Defect and Fault Tolerance in VLSI Systems*, 2005. *DFT* 2005. 20th *IEEE International Symposium on*, 2005, pp. 51-62.
[11] R. Nara, H. Atobe, Youhua Shi, N. Togawa, M. Yanagisawa, and T. Ohtsuki, "State-dependent changeable scan architecture against scan-based side channel attacks," *Circuits Syst. ISCAS Proc.* 2010 *IEEE Int. Symp. On*, pp. 1867-1870, May 2010.
[12] G. Sengar, D. Mukhopadhyay, and D. R. Chowdhury, "Secured Flipped Scan-Chain Model for Crypto-Architecture," *Comput.-Aided Des. Integr. Circuits Syst. IEEE Trans. On*, vol. 26, no. 11, pp. 2080-2084, November 2007.
[13] Y. Atobe, Youhua Shi, M. Yanagisawa, and N. Togawa, "Dynamically changeable secure scan architecture against scan-based side channel attack," *SoC Des. Conf ISOCC* 2012 *Int.*, pp. 155-158, 4.
[14] S. Paul, R. S. Chakraborty, and S. Bhunia, "VIm-Scan: A Low Overhead Scan Design Approach for Protection of Secret Key in Scan-Based Secure Chips," *VLSI Test Symp.* 2007 *25th IEEE*, pp. 455-460, 6.
[15] J. Da Rolt, G. Di Natale, M.-L. Flottes, and B. Rouzeyre, "Are advanced DfT structures sufficient for preventing scan-attacks?," *VLSI Test Symp. VTS* 2012 *IEEE* 30th, pp. 246-251, April 2012.
[16] Suresh Goyal, Michele Portolan, and Bradford Van Treuren, "Patent Application: Method and apparatus for providing scan chain security," U.S. Pat. No. 8,495,758.
[17] I. S. Kim and M. H. Kim, "Agent-based honeynet framework for protecting servers in campus networks," *Inf. Secur. IET*, vol. 6, no. 3, pp. 202-211, September 2012.

What is claimed is:

1. An integrated circuit comprising:
a first scan cell segment;
a second scan cell segment connected to one or more hidden content;
a segment insertion bit circuit connected to the first scan cell segment and the second scan cell segment, wherein the segment insertion bit circuit forms all or part of a serial data path, provides access to the first scan cell segment and prevents access to the second scan cell segment whenever a state of the segment insertion bit circuit is a first specified state, provides access to the second scan cell segment and prevents access to the first scan cell segment whenever the state of the segment insertion bit circuit is in a second specified state, and the segment insertion bit circuit requires clocking of a correct update value in an update cell and a correct key value in each of one or more key bits to change the state of the segment insertion bit circuit;
wherein the segment insertion bit circuit automatically switches to provide access to the first scan cell segment or prevents the state of the segment insertion bit circuit from being changed whenever one or more conditions are detected; and
wherein the one or more conditions comprise a circuit reset, a specified data from a real time clock, a specified time period since the segment insertion bit circuit was changed to the first specified state, a specified number of clock cycles since the first segment insertion bit circuit was changed to the first specified state, a specified number of shift cycles since the segment insertion bit circuit was changed to the first specified state, a specified number of shift-update cycles since the segment insertion bit circuit was changed to the first specified state, a specified number of capture cycles since the segment insertion bit circuit was changed to the first specified state, a specified number or set of shift signal toggles, a specified number of capture signal toggles, a specified number of update signal toggles, a data read or produced by an embedded instrument, a specified data obtained from a geographic location signal, a data obtained from a wireless connection, a data obtained from one or more inputs of the integrated circuit, or a combination thereof.

2. The integrated circuit as recited in claim 1, wherein:
the first scan cell segment has a first scan length;
the second scan cell segment has a second scan length; and
the first scan length is equal to the second scan length.

3. The integrated circuit as recited in claim 1, wherein:
the first scan cell segment comprises a single segment insertion bit circuit or a single scan cell circuit; and
the second scan cell segment comprises a single locking segment insertion bit circuit or a single locking scan cell circuit.

4. The integrated circuit as recited in claim 1, wherein the one or more hidden content comprises one or more embedded instruments, or keys, or traps, or serial registers, or data.

5. The integrated circuit as recited in claim 1, wherein the segment insertion bit circuit is part of a network or chain of scan cell circuits.

6. The integrated circuit as recited in claim 5, further comprising one or more trap bits within the network or chain of scan cell circuits that prevent a change of the state of the segment insertion bit circuit.

7. The integrated circuit as recited in claim 5, wherein the second scan cell segment comprises a locking segment insertion bit circuit and further comprising one or more trap bits within the network or chain of scan cell circuits that prevent the status of the locking segment insertion bit circuit from being changed.

8. The integrated circuit as recited in claim 1, further comprising a network or chain of scan cell circuits connected between the second scan cell segment and the one or more hidden content.

9. The integrated circuit as recited in claim 1, further comprising a pair of scan cell circuits placed in equivalent locations in both the first scan cell segment and the second scan cell segment, wherein a change in a status of one of the scan cell segments causes a corresponding change in a status of the other scan cell segment.

10. The integrated circuit as recited in claim 9, wherein the pair of scan cell circuits comprise a pair of honeytraps.

11. The integrated circuit as recited in claim 1, wherein the correct key value comprises:
a correct first value in each of one or more key bits to switch the segment insertion bit circuit to provide access to the first scan cell segment; and
a correct second value in each of one or more key bits to switch the segment insertion bit circuit to provide access to the second scan cell segment.

12. The integrated circuit as recited in claim 11, wherein the correct first value is not equal to the correct second value.

13. The integrated circuit as recited in claim 1, wherein the correct key value is generated by an embedded instrument, or a function logic circuit, or a memory, or a register, or a decryption circuit, or a circuit input, or bits shifted into a serial data path, or a combination thereof.

14. The integrated circuit as recited in claim 1, wherein:
a key value clocked into each of the one or more key bits is generated by an embedded instrument, or a function logic circuit, or a memory, or a register, or a decryption circuit, or a circuit input, or bits shifted into a serial data path, or a combination thereof; and
the key value clocked into each of the one or more key bits is compared to the correct key value.

15. The integrated circuit as recited in claim 1, further comprising a counter connected to the one or more key bits, and wherein the counter must contain a specified value to change the state of the segment insertion bit circuit.

16. The integrated circuit as recited in claim 15, wherein the specified value is less than or greater than a threshold value.

17. The integrated circuit as recited in claim 15, wherein the counter only increments when each of the one or more key bits is correctly set.

18. The integrated circuit as recited in claim 15, wherein a value to correctly set each of the one or more key bits changes or does not change on successive capture passes, or shift passes, or update passes, or shift and update passes.

19. The integrated circuit as recited in claim 15, wherein the counter comprises a capture counter, or a scan shift counter, or an update counter, or a scan shift and update counter.

20. The integrated circuit as recited in claim 19, wherein the scan shift counter must contain a specified shift value before clocking of the correct update value in an update cell to change the state of the segment insertion bit circuit.

21. The integrated circuit as recited in claim 20, wherein:
the segment insertion bit circuit is part of a network of scan cell circuits; and
the specified shift value depends on a current configuration of the network of scan cell circuits.

22. The integrated circuit as recited in claim 20, wherein the specified shift value is changed based on an operational history of the integrated circuit.

23. The integrated circuit as recited in claim 22, wherein the operational history of the integrated circuit is stored in a nonvolatile memory.

24. The integrated circuit as recited in claim 22, wherein the operational history is reset whenever a power to the integrated circuit is turned on.

25. The integrated circuit as recited in claim 22, wherein the operational history corresponds to a sequence of previously applied test signals, or a sequence of previously applied data signals, or a sequence of previously applied functional signals, or a sequence of previously applied control signals, or a sequence of scan cell circuits that have been opened or closed or switched, or a value of a real time clock, or a combination thereof.

26. The integrated circuit as recited in claim 22, wherein the operational history is reset with a pre-selected set of operations.

27. The integrated circuit as recited in claim 20, wherein the specified shift value is changed each time an update is applied, or a shift enable signal toggles, or an update-enable signal toggles, or a capture-enable signal toggles, or a combination thereof.

28. The integrated circuit as recited in claim 1, wherein the second scan cell segment comprises one or more key bits that must be correctly set to open a locking segment insertion bit circuit within a network of scan cell circuits.

29. The integrated circuit as recited in claim 1, wherein the second scan cell segment comprises a locking segment insertion bit circuit or a switching locking segment insertion bit circuit.

30. The integrated circuit as recited in claim 1, wherein the one or more hidden content, the segment insertion bit circuit the first scan cell segment and the second scan cell segment are disposed within a set of vertically stacked and electrically connected semiconductor dies.

31. The integrated circuit as recited in claim 30, further comprising a controller disposed on a first semiconductor die that accesses the segment insertion bit circuit disposed on a second semiconductor die.

32. The integrated circuit as recited in claim 31, wherein the controller comprises a test controller, a debug controller or a configuration controller.

33. The integrated circuit as recited in claim 31, further comprising a bitstream stored on a third semiconductor die that operates the segment insertion bit circuit.

34. The integrated circuit as recited in claim 31, wherein the test controller uses an authentication protocol to determine what data can be accepted from and given to a user.

35. The integrated circuit as recited in claim 31, wherein the test controller comprises a programmable logic circuit, or a dedicated logic circuit, or a processor, or a combination thereof.

36. The integrated circuit as recited in claim 35, further comprising a programming bitstream for the test controller that allows an authorized user to access or disable access to a proprietary data within the set of vertically stacked and electrically connected semiconductor dies.

37. The integrated circuit as recited in claim 36, wherein the programming bitstream is stored in an encrypted or obfuscated form in an external memory.

38. The integrated circuit as recited in claim 36, wherein the programming bitstream is stored within the set of vertically stacked and electrically connected semiconductor dies.

39. A method comprising:
providing a first scan cell segment, a second scan cell segment connected to one or more hidden content, and a segment insertion bit circuit connected to the first scan cell segment and the second scan cell segment, wherein the segment insertion bit circuit forms all or part of a serial data path;
providing access to the first scan cell segment and preventing access to the second scan cell segment whenever a state of the segment insertion bit circuit is a first specified state;
providing access to the second scan cell segment and preventing access to the first scan cell segment whenever the state of the segment insertion bit circuit is in a second specified state;
wherein the segment insertion bit circuit requires clocking of a correct update value in an update cell and a correct key value in each of one or more key bits to change the state of the segment insertion bit circuit;
automatically switching the segment insertion bit circuit to provide access to the first scan cell segment or prevent the state of the segment insertion bit circuit from being changed whenever one or more conditions are detected; and
wherein the one or more conditions comprise a circuit reset, a specified data from a real time clock, a specified time period since the segment insertion bit circuit was changed to the first specified state, a specified number of clock cycles since the first segment insertion bit circuit was changed to the first specified state, a specified number of shift cycles since the segment insertion bit circuit was changed to the first specified state, a specified number of shift-update cycles since the segment insertion bit circuit was changed to the first specified state, a specified number of capture cycles since the segment insertion bit circuit was changed to the first specified state, a specified number or set of shift signal toggles, a specified number of capture signal toggles, a specified number of update signal toggles, a data read or produced by an embedded instrument, a specified data obtained from a geographic location signal, a data obtained from a wireless connection, a data obtained from one or more inputs of the integrated circuit, or a combination thereof.

* * * * *